(12) United States Patent
Mun

(10) Patent No.: US 9,389,840 B2
(45) Date of Patent: *Jul. 12, 2016

(54) COMPILED AND EXECUTABLE METHOD

(71) Applicant: Johnathan Mun, Dublin, CA (US)

(72) Inventor: Johnathan Mun, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,288

(22) Filed: Mar. 11, 2014

(65) Prior Publication Data

US 2015/0317136 A1 Nov. 5, 2015

Related U.S. Application Data

(63) Continuation of application No. 12/378,171, filed on Feb. 11, 2009, now Pat. No. 8,713,543.

(51) Int. Cl.
*G06F 9/44* (2006.01)
*G06F 9/45* (2006.01)
*G06F 21/12* (2013.01)

(52) U.S. Cl.
CPC .. *G06F 8/41* (2013.01); *G06F 8/35* (2013.01); *G06F 8/44* (2013.01); *G06F 8/70* (2013.01); *G06F 21/125* (2013.01)

(58) Field of Classification Search
CPC ............... G06F 8/43; G06F 8/54; G06F 8/41; G06F 8/35; G06F 8/44; G06F 21/125; G06F 8/70
See application file for complete search history.

(56) References Cited

U.S. PATENT DOCUMENTS

| | | | | |
|---|---|---|---|---|
| 6,766,512 B1* | 7/2004 | Khosrowshahi | .......... | G06F 8/35 715/234 |
| 2005/0102127 A1* | 5/2005 | Crowe | .................. | G06Q 40/06 703/22 |
| 2006/0090156 A1* | 4/2006 | Tanenbaum | .............. | G06F 8/30 717/140 |
| 2006/0235761 A1* | 10/2006 | Johnson | ................. | G06Q 20/02 705/26.1 |
| 2007/0220416 A1* | 9/2007 | Mitsui | ................... | G06F 17/246 715/212 |
| 2007/0250764 A1* | 10/2007 | Jiang | ................... | G06F 17/2247 715/212 |
| 2007/0250811 A1* | 10/2007 | Ahs | .......................... | G06F 8/41 717/114 |
| 2008/0059474 A1* | 3/2008 | Lim | ..................... | G06F 17/3089 |
| 2008/0077912 A1* | 3/2008 | Zhang | ....................... | G06F 8/41 717/151 |
| 2008/0115119 A1* | 5/2008 | Lagergren | ............... | G06F 8/443 717/148 |
| 2009/0055810 A1* | 2/2009 | Kondur | ................. | G06F 9/5027 717/140 |
| 2009/0138863 A1* | 5/2009 | Lu | ......................... | G06F 21/125 717/159 |
| 2009/0172651 A1* | 7/2009 | Need | ......................... | G06F 8/41 717/146 |
| 2009/0217249 A1* | 8/2009 | Kim | .......................... | G06F 8/41 717/135 |
| 2009/0235087 A1* | 9/2009 | Bird | ........................ | G06F 21/10 713/190 |
| 2009/0320007 A1* | 12/2009 | Krishnaswamy | ... | G06F 9/44521 717/151 |
| 2010/0257507 A1* | 10/2010 | Warren | ...................... | G06F 8/41 717/106 |

OTHER PUBLICATIONS

Erich Neuwirth, Spreadsheets as Tools for Statistical Computing and Statistics Education, 2000, pp. 1-8.*

(Continued)

*Primary Examiner* — Thuy Dao
*Assistant Examiner* — Mongbao Nguyen
(74) *Attorney, Agent, or Firm* — James M. Smedley LLC; James Michael Smedley, Esq.

(57) ABSTRACT

A method and software system allowing the ability to use an existing Excel model and extract the business intelligence, relationships, computations and model into pure mathematical relationships and codes such that the business intelligence in the original model is completely protected and the model can be run at extremely high speed and advanced simulations of hundreds of thousands to millions of trials can be run.

21 Claims, 11 Drawing Sheets

(56) References Cited

OTHER PUBLICATIONS

Christopher J. Van Wyk, Using Spreadsheets to Learn Numerical Methods, 2006, pp. 1-12.*

James A. Hoag, A Dissertation, 2009, pp. 57-65 and 105-161.*

* cited by examiner

FIGURE 3

ACTIVATE LICENSE

If you have received a license file, please click the Activate button and select the license file.

026 — [Activate]

If you do not have a license file, please send an e-mail to admin@realoptionsvaluation.com with the Hardware ID below (select the ID and right-click to copy) to receive a quote.

027 — Hardware ID  IvxSirvm09XsnDFsis

Alternatively, you may fill in the form below and click Compose. This program will automatically compose the message with all necessary details. You may also include your personal message below in the e-mail.

028 — Name

Company

Message (Optional)

[Compose] — 029

[Close]

FIGURE 7

| | A | B | C | D | E | F | G | |
|---|---|---|---|---|---|---|---|---|
| 1 | | | | | | | | |
| 2 | | | Excel Model | | | | | |
| 3 | | | | | | | | |
| 4 | | Input 1 | 1258.21 | Input 4 | 126.25 | | | |
| 5 | | Input 2 | 5851.24 | Input 5 | 296.40 | | | |
| 6 | | Input 3 | 256.64 | Input 6 | 18696.01 | | | |
| 7 | | | | | | | | |
| 8 | | Output 1 | 3127.84 | | | | | |
| 9 | | Output 2 | 547.56 | | | | | |
| 10 | | Output 3 | 3191.94 | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |

MICROSOFT EXCEL — 097
RISK EXTRACTOR — 099
BUILD MODEL — 100
CLEAR MODEL
ADD ALL PRECEDENTS — 101
ADD INPUT CELLS / REMOVE INPUT CELLS — 102
ADD OUTPUT CELLS / REMOVE OUTPUT CELLS — 103
098

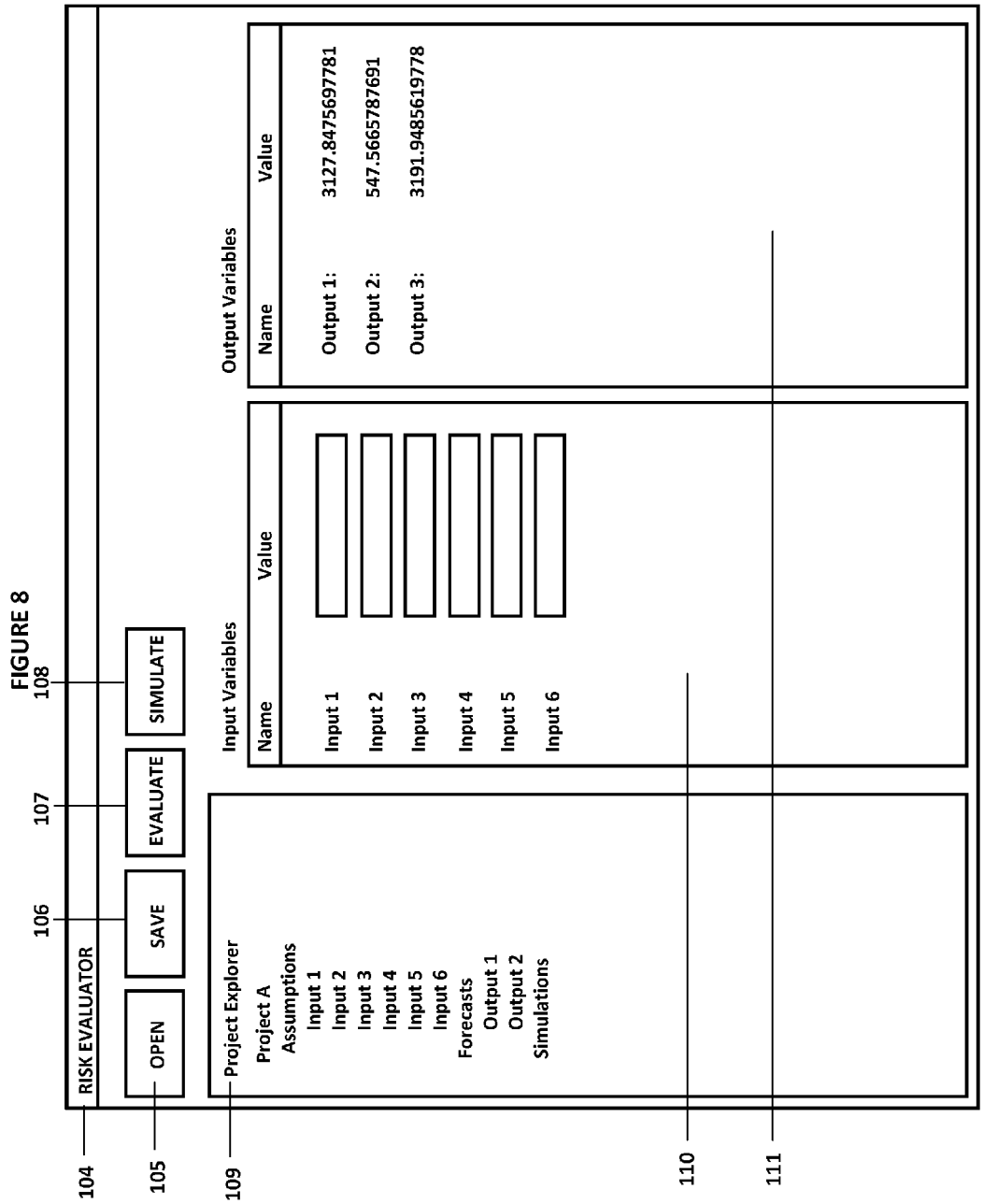

FIGURE 9

INPUT PROPERTIES

- Name ⎯⎯ 112
- Value ⎯⎯ 114

Cell Address ⎯⎯ 113
☒ Apply Simulation ⎯⎯ 115

Assumption Distribution ⎯⎯ 116

| Normal | Triangular | Uniform | Beta | Cauchy | Chi-Square |
|---|---|---|---|---|---|
| Exponential | F Distribution | Gamma | Gumbel Max | Gumbel Min | Logistic |
| Lognormal | Pareto | Rayleigh | T Distribution | Weibull | Bernoulli |
| Binomial | Discrete Uniform | Geometric | Hyper-geometric | Negative Binomial | |

DISTRIBUTIONAL PARAMETERS ⎯⎯ 117

Parameter 1: ▭   Parameter 2: ▭   Parameter 3: ▭

[ OK ]   [ Cancel ]

COMPILED AND EXECUTABLE METHOD

CROSS REFERENCE TO RELATED APPLICATIONS

This application is a continuation of U.S. patent application Ser. No. 12/378,171 filed on Feb. 11, 2009, the entire disclosure of which is incorporated herein by reference.

COPYRIGHT AND TRADEMARK NOTICE

A portion of the disclosure of this patent document contains materials subject to copyright and trademark protection. The copyright and trademark owner has no objection to the facsimile reproduction by anyone of the patent document or the patent disclosure, as it appears in the U.S. Patent and Trademark Office patent files or records, but otherwise reserves all copyrights whatsoever.

BACKGROUND OF THE INVENTION

The present invention is in the field of general analytics and modeling. Analysts from all industries and applications use Microsoft Excel to create simple to highly complex models. These can range from a financial statement, forecast projections of revenues for a firm, earnings per share computations, chemical reactions, business processes, manufacturing processes, pricing and profit analysis, costing models, stock price valuation, economic projections, corporate valuations, project time management, and thousands of other applications. These analysts may create their models in a single worksheet or span multiple worksheets in a single workbook (a workbook is synonymous to a Microsoft Excel file, whereby in each workbook there might be one or many worksheets). In most cases, these Microsoft Excel models are highly proprietary and contain trade secrets and intellectual property of the firm, and if fallen into the wrong hands, might mean financial ruin for some companies. Microsoft Excel has some built-in password protections but there exists many off-the-shelf password cracks that can very easily defeat these passwords by modifying the Microsoft Excel file itself. Further, if the model is very detailed and large, sometimes it takes a long time to compute the results. This is especially evident when more sophisticated analytics like Monte Carlo simulation is run. Monte Carlo simulation is an analytical technique of random number sampling based on some predefined probability distributions and the analysis can be run thousands to even millions of times Think of simulation as a very powerful scenario analysis, where thousands upon thousands of scenarios are generated automatically, following some predefined rules. Running such an analysis within Microsoft Excel can sometimes take multiple hours and even days, because once a single change is made, Microsoft Excel has to accept this new value, replaces the value into the right cell, computes all the other cells that is related to this computation, update all other irrelevant items in the workbook (e.g., links, charts, pictures, graphics, color scheme, and many others) and it takes time and resources to do such computations. Finally, if the model is sent by the model creator to an end-user, some of these complicated computations might accidentally be deleted, edited, changed and so forth making the model incorrectly specified and broken. This also allows end-users to game the system by changing the structure of the model to suit his or her needs. The present invention is a business process, with a preferred embodiment comprising two software modules (these software programs are named "ROV Compiler", and "ROV Extractor and Evaluator") capable of compiling and extracting these analytical models where the logic of the models is maintained, but will be compiled into a form so that the business intelligence and intellectual property of the firm is protected in an encrypted and hidden in a computer binary format (the acronym "ROV" refers to Real Options Valuation, Inc., the trademark name of software developer). In other words, the end-user of these compiled and extracted files cannot break into and decipher the business intelligence, cannot modify the model logic, cannot access the file unless provided a license and password, and can only use the model as is. Such a business process will yield significant value to a corporation that requires the ability to protect its own intellectual property and business intelligence. Another use is for modelers and analysts to create their own models and protect them, and be able to sell these compiled versions as standalone software applications. This allows the proliferation of more knowledge and business intelligence in the world when creators of advanced models and applications will be more willing to share their model intelligence knowing that they have the ability to lock up their most crucial trade secrets. Throughout this document, the term "model creator" will imply the individuals using the compiler and extractor methods in the form of the software modules, which are the preferred embodiments of the present invention whereas the term "end-user" implies the recipient and users of the compiled and extracted files (these are the clients, employees, or customers of the model creator).

SUMMARY OF THE INVENTION

There are two new business process approaches to this method. The first is a "Compiler" method with the preferred embodiment as the software named ROV Compiler, and the second is the "Extractor and Evaluator" method, with the preferred embodiment as the software named "ROV Extractor and Evaluator."

In the Compiler method, using any existing Microsoft Excel file, you can compile the relevant *.xls, *.xlsx and *.xlsm files into an *.exe self-executable file, where the outputs and computations in Microsoft Excel (anything with a function or equation and calculation) will be completely hidden in coded and encrypted binary format and cannot be changed or viewed by the end-user, and only the inputs in the file can be changed. The idea is basically to programmatically seize the Microsoft Excel file. When the Microsoft Excel workbook is saved, the Compiler injects several lines of source code inside the workbook and then puts the workbook and a newly generated computer dynamic link library file (*.dll) into a new executable (*.exe) file. The *.dll file basically consists of codes to programmatically seize Microsoft Excel and the formula and computations for each of the cells in the workbook. This method compiles quickly because it generates the *.exe and do nothing to the workbook file, which means no matter how small or large or complex the Microsoft Excel file is, it will always compile. When the final output compiled *.exe file is run, it basically unzips the modified and compiled workbook file and the *.dll into a temporary directory, and launches Microsoft Excel to open the workbook from the temporary directory. When Microsoft Excel opens, the Visual Basic for Applications (VBA) function "Auto Open" executes, which injects the seize-program code into Microsoft Excel. After that, everything that is done in Microsoft Excel is captured by the *.dll and this *.dll can decide whether to let Microsoft Excel handle the command or it does its own actions. For example, File-Open will be redirect to Microsoft Excel, whereas File-Save will not. This includes every single mouse-click and all typing that is done, will be captured by the *.dll file. When changes are made to a cell, the *.dll will see it and it will recalculate all the cells as required and paste the results back into the worksheet. And these output cells are protected, which means the end-user cannot change a computation manually and if he attempts to do so, the cell simply reverts back to its original value, so you can't change it.

The Extractor and Evaluator method, in contrast, does not programmatically seize the Microsoft Excel file like in the compiler method. In contrast, as the name states, it extracts the intelligence from the model. That is, everything that is built within Microsoft Excel can be broken down to its most fundamental form, its mathematical equations. The extractor business process method simply allows the model creator to identify which cells are considered key inputs and key outputs. Then, the extractor takes each of the key outputs and traces all the precedents of the model to determine the linkages in the model, and identifies each of the model thread. Imagine the complex model as a large spider web, with multiple threads and interrelationships. The extractor looks at and examines each of the thread in isolation, and then together as a whole, to identify the patterns and relationships between these key inputs and key outputs, and how all the intermediate variables (all other variables, computations, values and cells that are neither key inputs nor key outputs), and recreates its own logic in mathematical and software code. This includes the ability to replicate all preset functions that come with Microsoft Excel. By doing this, the entire Microsoft Excel model can be lifted or extracted into mathematical code which can be run in memory, independent of Microsoft Excel. Therefore, these lifted or extracted codes can be compiled into an *.exp file (please note that the *.exe file is for the compiler method whereas the *.exp file is for the extractor and evaluator method). This *.exp file is then compiled and cannot be cracked by the end-user, and because this file is in pure mathematical code, it can run at anywhere from 1,000 times to 1 million times faster than in its original Microsoft Excel file format. Using this *.exp file, we can now run more advanced analytics like Monte Carlo simulation at extremely fast speed. Models that typically would have taken days to run can be run in seconds or minutes. This business process method therefore saves companies and organizations precious computing resources, time and money, providing the results they need quickly and accurately, and complemented by some advanced analytic techniques.

The goal of this invention is to restrict the access of sensitive models, files, financial information, business intelligence and trade secrets only to authorized individuals, and limits end-users' activities to the minimum required for business purposes. This will eliminate the chances of exposure of corporate secrets, breaches in customer or intellectual property confidentiality, and the protection of a company's models from being altered (either accidentally or intentionally). Model creators can also add their corporate splash screens to have a chance to advertise his/her own company name, and add the application name, version, company name and copyright information as well as his/her own end-user license agreement information. This whole process makes it super simple and effective protection procedure, without the need for additional programming, and allows Microsoft Excel to be used as a programming tool instead of a modeling tool. Also, using this approach, model creators can now create their own software applications plus change the modeling paradigm into something that is component based modeling. This means we can take multiple Microsoft Excel files and link them together as executable files or running them together in another software application if required. Finally, the business method can allow the computations of extremely complex models to be performed at a very high speed.

BRIEF DESCRIPTION OF THE DRAWING

FIG. 03 illustrates the licensing to unlock and use the Compiler and Extractor-Evaluator methods. This licensing tool applies to these two approaches.

FIG. 07 illustrates a sample workbook Microsoft Excel file and the application of the second method, the extractor and compiler process, and how the model extraction can occur.

FIG. 08 illustrates the second method's evaluator method and how it is used to compute the extracted file.

FIG. 09 illustrates the simulation analytics embedded in the Evaluator method.

DETAILED DESCRIPTION OF THE INVENTION

Figure 1:
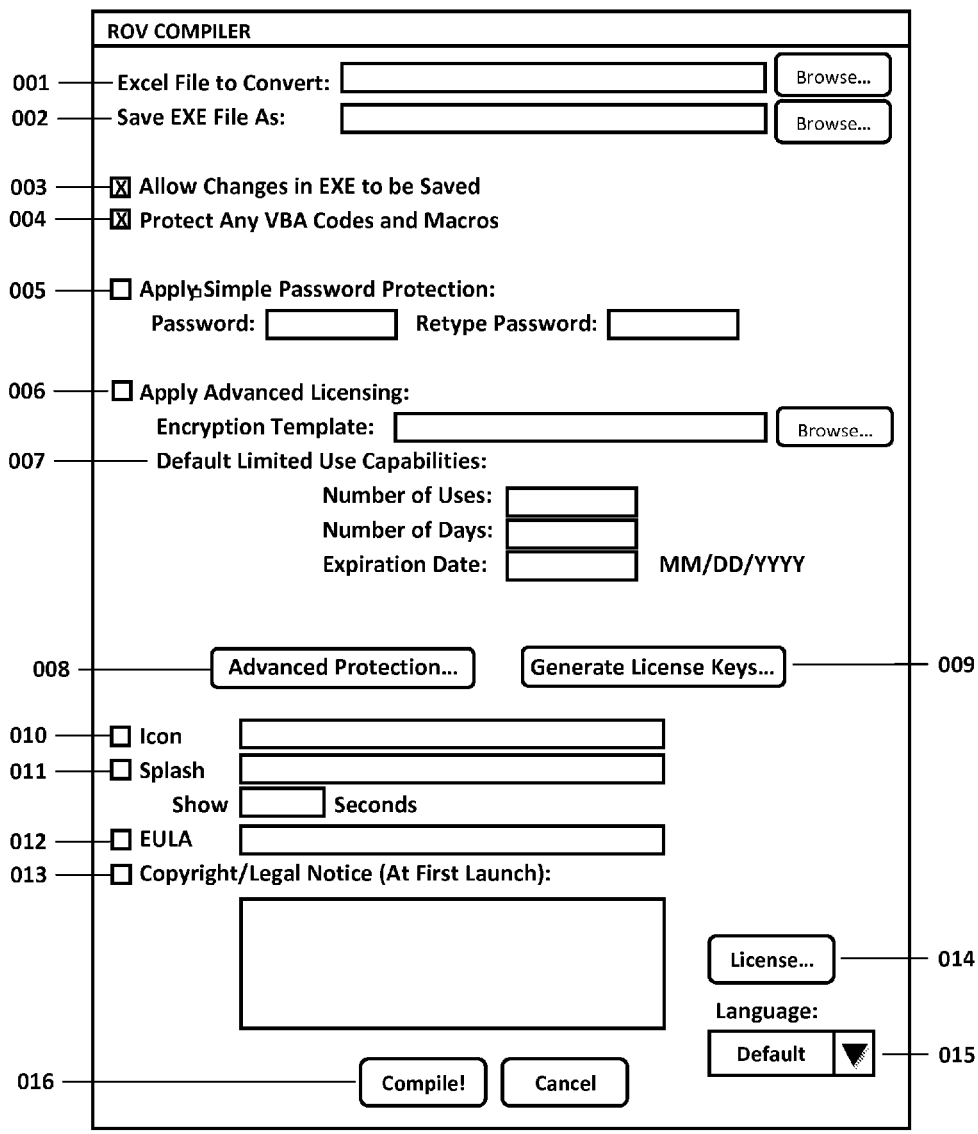
FIG. 01 illustrates the preferred embodiment of the invention, in the form of a software program called ROV Compiler.

The ROV Compiler is a software program that executes the Compiler method of the invention. This business process method programmatically seizes any Microsoft Excel file (including *.xls, *.xlsx, and *.xlsm files in Excel XP, 2003, 2007 as well as later versions). This tool can be installed and runs on Windows XP, Vista 32 bit, Vista 64 bit, any other versions of Windows as well as Linux and Apple Computer's Macintosh operating system (hereinafter "MAC") platforms. This software also has two sets of licensing protection. The first licensing protection is where the actual ROV Compiler software itself is licensed to model creators. The other license control is the compiler model creator compiling an existing Microsoft Excel file into the *.exe and putting in some license protection in the generated *.exe file such that only authorized end-users can access and run this *.exe file. The compiler takes all the formulas from the user's Microsoft Excel file and creates an application *.exe file that is encrypted in binary format and prevents a formula from displaying in the formula bar, so that the end-user will be unable to view or change it. The *.exe file requires Microsoft Excel in order to run. Everything with an equation or function or computation will only show the results but not the equation or function itself. The end-user cannot delete, edit or change a cell with a function or equation. If changing/deleting/editing, then the cell will be replaced by the results. The end-user can only change the inputs in the *.exe file and anything that is not an equation or function or calculation. The original Microsoft Excel model can be highly complex or simple. An example of a simple model is A+B=C, where the variables A and B are the inputs and C is the computed output. So, by replacing A and B with some numbers, we compute the result C. For example, if A is 10 and B is 20, then C is computed to be 30. If this model is compiled, the end-user will only see the value 30 and not the equation of A+B. The end-user can only change the values for A and B, or 10 and 20, to any input he or she desires, and the value C will be computed. However, the end-user cannot change the value C and cannot see the logic in computing C. In addition, all of the linked add-ins *.xla files, which are used by the model, are compiled inside the *.exe. That is, sometimes a Microsoft Excel model may use some external software called an add-in, which has its own business logic and mathematical functions. When the compiled *.exe file is sent, any add-ins (*.xla files) will also be encapsulated and compiled in the *.exe. The *.exe will take care of installing the add-ins *.xla files. The ROV Compiler is built using C# programming language under the Microsoft .NET Framework 2.0 and 3.0. In addition, this ROV Compiler is built using a modular concept. Specifically, this tool can be used in several ways:

a. This compiled *.exe file can then be run in command mode (in a console in Windows or MAC or embedded inside another software). If end-user has a large model (hundreds of inputs and hundreds of outputs), the end-user can select specific inputs and outputs in the Microsoft Excel model and select as many key inputs and outputs as he or she wishes. So, out of the hundreds of inputs and outputs in the large model, model creator might only choose 3 key inputs and 2 key outputs in the model. Then, model creator compiles the entire large Microsoft Excel file into the *.exe. Then, in command mode, the end-user can call and run the *.exe. For example, to run ROV Compiler in command mode with n inputs and m outputs, the end-user can enter <filename.exe>inputs=<input 1>, <input 2>, . . . , <input n><enter>. The ROV Compiler will execute and display the results in a comma-delimited listing: <output 1>, <output 2>, . . . , <output m>.

b. In order to identify which are the selected few key inputs and outputs, in model creator's Microsoft Excel model, the model creator needs to add a new worksheet called "ROV Compiler" and in this worksheet, have two columns with headers "Inputs" and "Outputs" and in these two columns, model creator can put as many inputs and outputs as he likes, then link these inputs into the model and the outputs from the model (from/to other worksheets). So, when compiling, the ROV Compiler will look for this worksheet (if none exists, the command line *.exe cannot run), if this worksheet exists, then when we run the *.exe in command line mode, as we will know the inputs (in sequence exactly how it is entered in this ROV Compiler worksheet) and the results generated will be in the order and sequence of this worksheet's outputs column.

c. This means it should also be able to be run in any other software easily and quickly where the compiled *.exe file can be used in a component based modeling paradigm, whereby the inputs of an *.exe can be the outputs of another *.exe file, and all these can be linked as one another in the model creator's own proprietary software environment. This is done by running each compiled model sequentially.

d. The compiler also has the ability to have licensing control for the *.exe that is generated. This means in the user interface for the ROV Compiler, there should be a place to put in a model creator encryption template (e.g., model creator can enter his or her own sequence of characters such as "638hshd^%&$%&*( )" to be used as an encryption template) and this encryption is stored in the *.dll, and the user interface will also have the ability to generate a password (this encryption and password is optional) where the password will only work on this specific *.exe file and no other file except if the same encryption template exists. In addition, the licensing control also has some optional advanced features whereby there exists:

i. Hardware locking. The *.exe application can be locked to a target computer by looking at the Hardware ID of the target computer and the license can be generated to work only on this computer. The Hardware ID is automatically generated by the Compiler and Evaluator, by extracting the end-user's hardware serial numbers (e.g., motherboard, hard drive, operating system, and other components) and applies a proprietary calculation to generate this identification number that is unique to each computer. Such a hardware locking mechanism serves as application copy protection, which prevents illegal copying from one computer to another.

ii. The ROV Compiler's licensing capabilities also permit the model creator to limit the end-users' use of the ROV Compiler. This can be accomplished either via usage restrictions or time restrictions. Usage restrictions track the number of times that the ROV Compiler is used; once the threshold limit set by the user is met, the end-user can no longer use the ROV Compiler. The time restriction code inserts a secret time stamp into the end-user's computer registry. The ROV Compiler can only be used up to the date in the time stamp. Additionally, the time stamp is able to detect if the end-user's system clock has been altered; if so, the end-user will not be able to access the ROV Compiler.

e. The ROV Compiler can convert and compile multiple Microsoft Excel model files simultaneously.

f. The ROV Compiler has the option for model creator to choose if the VBA macros and VBA scripts/models/functions created will be visible to the end-user or will be also saved and compiled into the *.dll such that the macros and functions will all not be visible and are protected inside the *.exe, and when end-user runs the *.exe, the macros and VBA codes will all run as usual.

For the Extractor and Evaluator method, the preferred embodiment of the method is in two software modules termed ROV Extractor and ROV Evaluator. The Extractor is an add-in that opens inside of Microsoft Excel and allows the model creator to identify the key inputs and outputs in the model. Then, the Extractor will build the model by looking at the computational threads in the model and lifts the entire model into computational code. These mathematical relationships will then be compiled into an *.exp file. The Extractor replicates all of the functionalities in Microsoft Excel and when the model is lifted, all Microsoft Excel-based functions and computations will be replaced by ROV Extractor's functions. Then, depending on the selected inputs and outputs in the model, the Extractor module will optimize the computational math and streamline the code such that it will be highly efficient and runs at a high speed. The extracted *.exp file will be encrypted at a 256 bit AES (advanced encryption standard) and above, and the file itself can be password protected so that unauthorized access is not permitted. Furthermore, the extracted *.exp file can only be opened by the ROV Evaluator module. The Extractor and Evaluator methods are linked by an internal set of encryption template complemented by an algorithm which acts like a lock and key, which are internal to the widget. Only the Evaluator can open the *.exp Extractor files. The ROV Extractor will then be able to act like a calculator, whereby a large and complex model in Microsoft Excel is compiled into a set of simple inputs and outputs, linked by some optimized mathematical functions. The end-user simply enters some inputs and the outputs are computed automatically and at an extremely high speed. These *.exp files can then be used in other software applications where a set of highly complex models can be reduced to a single file which can be called as a single function in these other software applications. This allows the ability to link multiple *.exp files into a larger and more complex model. This is termed component based modeling. Further, these components are linked together in a large modeling web, and at the same time, large scale Monte Carlo simulations (in the hundreds of thousands and multiple millions of trials) can be run on each of these components, returning the results within seconds and minutes, making highly sophisticated and advanced computations now possible.

Figure 2:
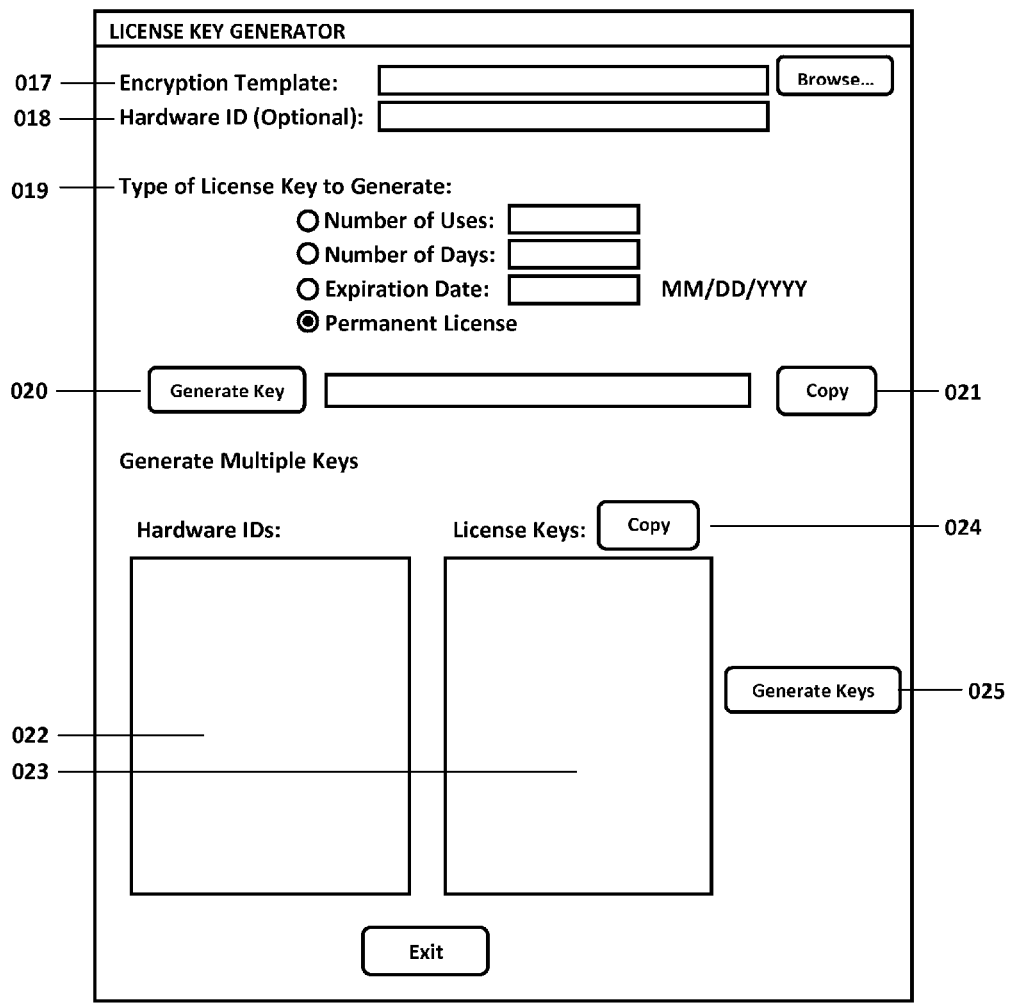
FIG. 02 illustrates the license key generator that is used in the Compiler method to protect the compiled *.exe file. This licensing control is to protect the compiled *.exe and extracted *.exp files from being used by unauthorized personnel.

FIG. 01 illustrates the preferred embodiment of the invention within two software modules, named ROV Compiler and ROV Extractor and Evaluator. Each module has its own specific uses and applications. Excel File to Convert 001 is the path/name of the Excel file to convert, and the Save EXE File As 002 is the path/name of the compiled EXE file to be saved. The checkbox, Allow Changes in EXE to be Saved 003, identifies if the creator of the compiled file wants the end-user to be able to save any changes, and if any existing VBA or Visual Basic for Applications codes attached to the file will be protected 004. The checkbox, Apply Password Protection 005 requires that a password be used to open the compiled file. This password is a simple password set up by the model creator. This means that any end-user with the password will be able to access and run the *.exe file. In contrast, the advanced licensing 006 capabilities allows the model creator to enter in an encryption template and set specific use restrictions 007 on the *.exe by default, such as the total number of uses allowed, the number of days before the license expires and a specific default expiration date. These license protections can be set by the model creator as default protection levels. Additional protection 008 can be set, and additional license keys 009 can be generated to allow the end-user the ability to extend the use of the *.exe to another time period or permanently license the *.exe file, and these licenses will be restricted only to specific computers through the Hardware ID protection as illustrated in FIG. 2 later. Next, the model creator can link to a *.jpg or *.bmp or *.ico file 010 and these files will be set as the icon for the *.exe. The model creator can also link to some *.jpg or *.bmp file and it will be shown when *.exe starts, and this splash screen 011 will be shown for 3 seconds by default or this time period can be changed as required. An end-user license agreement or EULA 012 can also be set to show when the *.exe is used for the first time, where the model creator can link to a text file containing this EULA and the end-user will need to accept this EULA before being able to use the *.exe file for the first time. A copyright and legal notice 013 is also available should the model creator wishes to enter in his own copyright, legal or company information. A license generator 014 is available for the model creator to generate any types of advanced licensing keys if required, and the details of this license generator is shown in FIG. 2. The user interface can also be adapted to different foreign languages 015 and when all the configurations are set to the model creator's specifications, the Microsoft Excel file can then be compiled 016 into the *.exe file.

FIG. 02 illustrates the license control for the ROV Compiler, that is, the license protection of the compiled *.exe file (this screen is obtained by clicking on item 9 described above). The model creator can enter in or link to an encryption template 017 which in concert with the end-user's Hardware ID 018 will be used generate the license key. The encryption template can be thought of as a master key creator, where only the model creator would have access to, and using this encryption template, multiple license keys can be created. The present invention's method allows the software to access the end-user computer's hardware and software configurations such as the user name on the computer, serial number on the operating system, serial numbers from various hardware devices such as the hard drive, motherboard, wireless and Ethernet card, take these values and apply some proprietary mathematical algorithms to convert them into a 10 to 20 alphanumerical Hardware ID. These Hardware IDs are unique to each computer and no two computers have the same identification. The prefix to this Hardware ID indicates the software type while the last letter on the ID indicates the type of hardware configuration on this computer (e.g., the letter "F" indicates that the hard drive and motherboard are properly installed and these serial numbers are used to generate this ID). Other suffix letters indicate various combinations of serial numbers used. Typically, when the end-user installs and runs the compiled *.exe file for the first time, the end-user will be provided with this Hardware ID, whereby the end-user will then provide this information to the model creator, who will in turn create a license key for the end-user. Further, the model creator can then decide how to control the compiled *.exe file using the various license controls 019, allowing the end-user to use the *.exe file a certain number of times, certain number of days, up to a certain date, or a permanent license. Once these configurations are set, the license can then be generated 020 and the key can then be copied 021 into memory on the computer's clipboard and pasted in an e-mail to the end-user. The licensing tool also allows the model creator to generate mass keys by entering multiple Hardware IDs at once 022 to generate a list of corresponding license keys 023 and copied into memory 024 after depressing the generate keys button 025.

FIG. 03 illustrates the license activation technique for the ROV Compiler and ROV Extractor and Evaluator. The end-user can activate 026 the tool if he or she has a permanent or trial license. All licenses issued are linked to the hardware devices on the end-user's computer using the Hardware ID 027. In the event that the end-user does not have a valid license, he or she can automatically contact the ROV Compiler license server by entering the end-user's name, company and a short message 028 requesting a trial or permanent license and clicking on compose 029 to send the message off.

Figure 4:
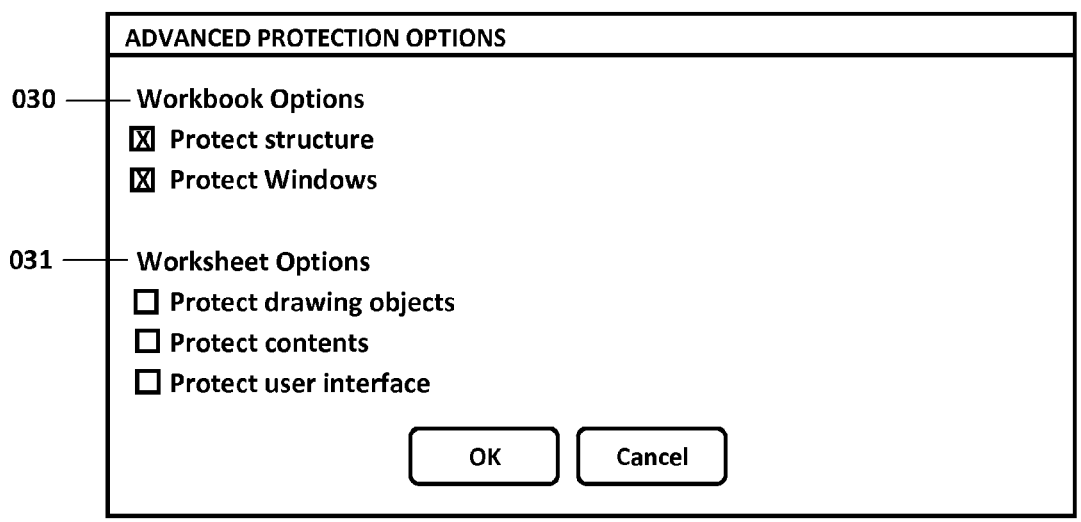
FIG. 04 illustrates the level of detail of protection of the Compile method, in deciding which elements of the workbook and worksheets need to be protected.

FIG. 04 illustrates the advanced protection properties. Specifically, it shows the level of protection that is available at the workbook level 030 and at the worksheet level 031. For example, the model creator can decide if the drawing objects and charts should be protected or allowed to be changed by the end-user, and so forth.

Figure 5:
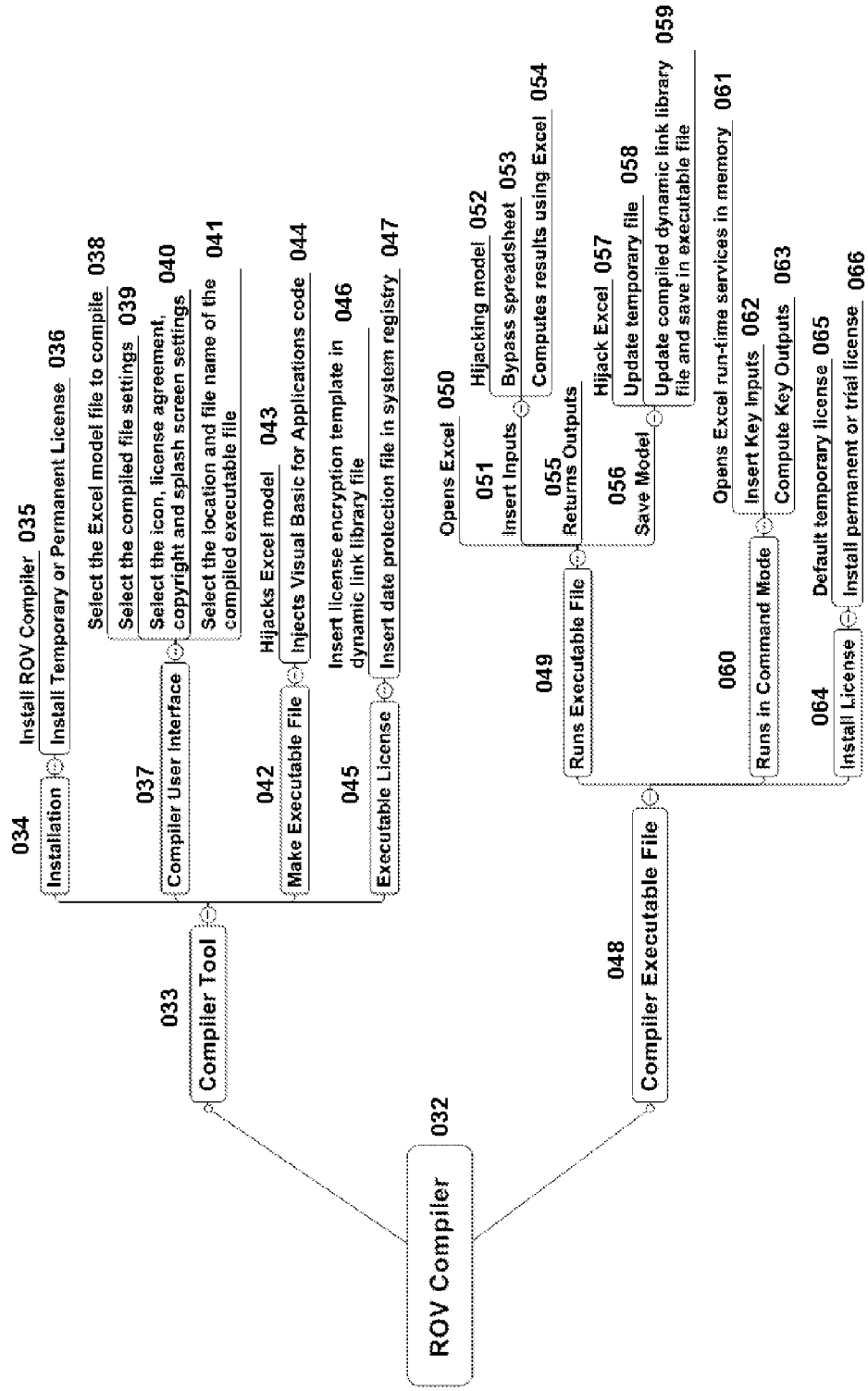
FIG. 05 illustrates the Compiler method in a graphical drawing, showing the relevant steps and business process used in the compiler tool to make the compile *.exe file as well as the business process method of the compiled *.exe file itself.

FIG. 05 illustrates the business process in the compiler method 032 as a mind map illustration (this is a map of the two areas of the compiler method). The compiler tool 033 will need to be installed 034 as regular software. The installed version is named ROV Compiler 035 and in order to activate the ROV Compiler, a temporary or permanent license will be issued to the end-user 036. The model creator then starts the ROV Compiler and sees a user interface 037 whereupon the model creator can select the relevant Microsoft Excel file to compile 038, and the properties of the relevant settings can be set 039, including any password protections. Then the model creator can decide if additional items such as icons, license agreements, copyright notification and splash screens are required 040. Next, the location and name of the compiled *.exe file 041 is set by the model creator. The model creator then clicks on the compile button to make the executable *exe file 042. The ROV Compiler then programmatically seizes the Microsoft Excel file 043 and injects some VBA code 044 of its own, creates the executable's license protection 045 and inserts the license password's encryption template into the *.dll file 046, and the date of creation of the license and the *.exe file into the *.dll such that when this *.exe is first installed on the end-user's computer, this information will be stored on the end-user's computer registry 047. The *.exe is then created 048. The compiled *.exe file is then sent to and used by the end-user who would run the file 049, which will in turn open Microsoft Excel 050 and display the model. The end-user then types in and inserts some inputs 051, and the *.exe will programmatically seize Microsoft Excel 052 and bypasses the spreadsheet computations 053, decides which actions will be executed by Microsoft Excel 054 and which it will compute or run itself. Then, the results will be returned 055 to the end-user in Microsoft Excel. All actions and computations will be handled by Excel except for saving 056 the file, license protection and overriding any output cells, which will be handled by the *.exe itself by programmatically seizing Microsoft Excel 057, creating and updating a temporary file in memory 058 and saving the updated *.dll file 059. Alternatively, the end-user can run the compiled *.exe file using command mode 060. Command mode simply means running the file in the MS-DOS operating system or embedded inside another software application. When running in command mode, the *.exe opens a runtime service of Microsoft Excel in memory 061, inserts the key inputs 062 and computes and returns the key outputs 063. If the compiled *.exe file has some password and license protection, then the license will need to be installed 064 before the *.exe can be used. Sometimes, the *.exe might come with a default license 065 of several days for the end-user to try out the model before purchasing a permanent or obtaining another extended trial license 066.

Figure 6:
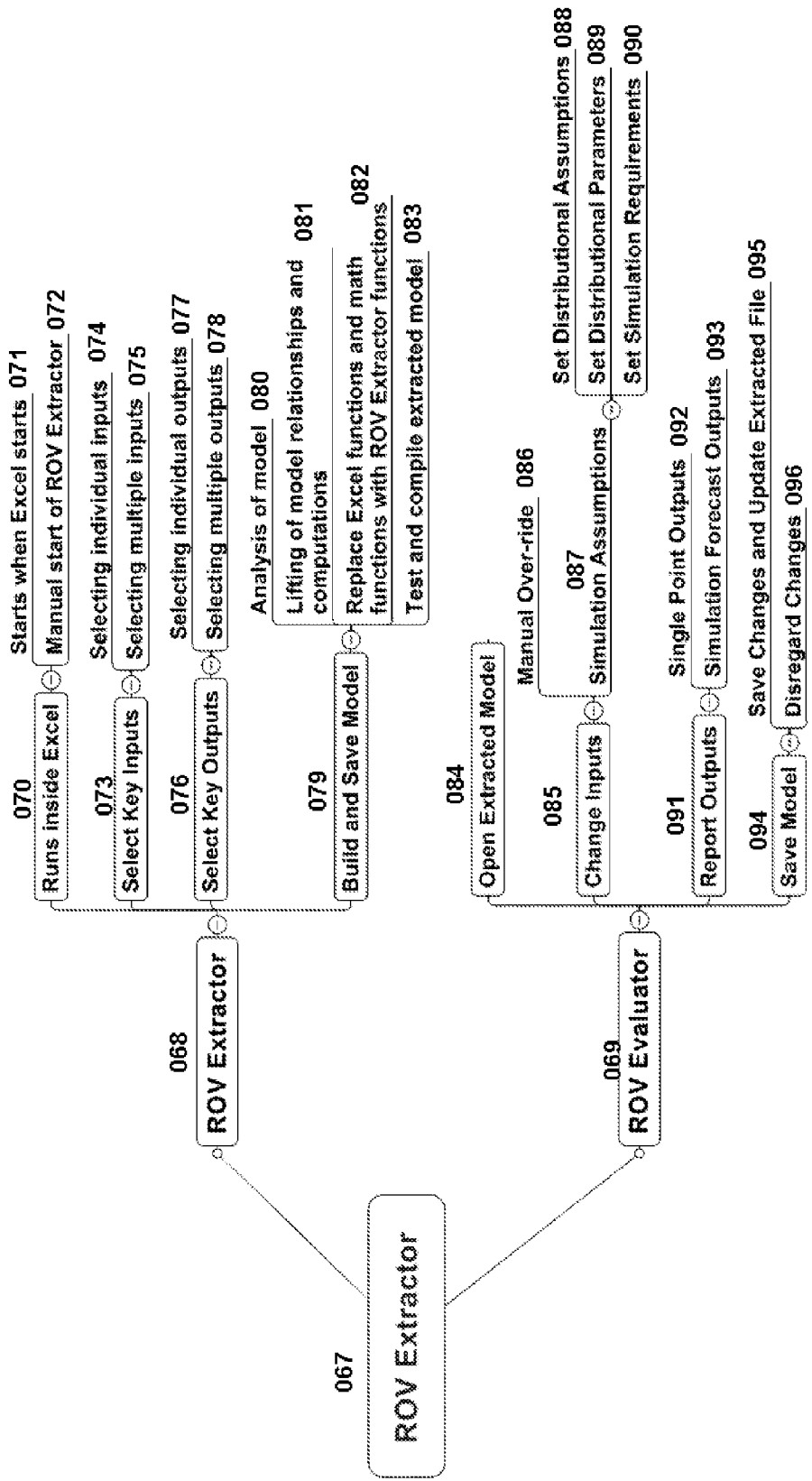
FIG. 06 illustrates the second business process method, the extractor and evaluator process in graphical format.

FIG. 06 illustrates the business process in the extractor and evaluator method 067. The preferred embodiment of the business process extractor and evaluator are the ROV Extractor 068 and the ROV Evaluator 069. While the ROV Compiler runs outside of Microsoft Excel, the ROV Extractor runs inside Microsoft Excel as an add-in 070. This software can be set to start when Microsoft Excel starts 071 or can be started manually 072. Model creator then selects the cells that are deemed to be the key inputs 073, and individual cells 074 or multiple cells 075 can be selected at once. Model creator can also select the Add All Precedents function to automatically add all inputs in the entire model as key inputs. Then, the key outputs 076 are selected, and again, individual cells 77 or multiple cells 078 can be selected at once. The model is then saved and "built" 079. Building the model means that the model is first analyzed 080 in detail, where the inter-relationships among all the variables and the business logic and intelligence embedded in the model is lifted, including all the computations 081 and all predefined Microsoft Excel functions are then replaced with the ROV Extractor's own functions 082 and the lifted model is then tested and the model compiled into the *.exp file 083. This *.exp file can be saved or sent to the end-user. When the end-user receives this *.exp extracted and compiled file, it can be opened 084 using the ROV Evaluator tool, the second part of this extractor and evaluator method. The end-user can then change any of the inputs 085 as required by manually overriding any values 086 as well as setting simulation assumptions 087 to run Monte Carlo simulation on the model. If simulation is required, the end-user will set the distributional assumptions 088 such as what distribution is used and the parameters 089 (e.g., a normal distribution is set for revenues, with a mean of 100 and a standard deviation of 10), as well as any other requirements 090 to run the simulation such as how many trials to run (e.g., 1 million trials) and the seed value (i.e., the mathematical starting point of the random number generator). After the simulation or regular computations are run, the ROV Evaluator reports the outputs 091 which includes single point outputs 092 and simulation forecast outputs 093 where each output variable has thousands or millions of values, together with all the relevant statistics of these multiple values (e.g., mean, standard deviation, variance, quartiles, inter-quartile range, range, minimum, maximum, coefficient of variation, among other things). The end-user can then decide if the model and results should be saved 094 and updated to the extracted *.exp file 095 or all changes will be disregarded 096 and not saved.

FIG. 07 illustrates a sample Microsoft Excel 097 model complete with business logic and intelligence in the model generated by the model creator 098, and the location of the ROV Extractor menu and icons. For example, the model creator can build the model 099 (i.e., extracting the model into the *.exp file) or clear the model 100 after all of the input precedents 101 are set or specific input cells are set 102 and the output cells are set 103. When clicking these buttons, the cell colors will change in the worksheet, highlighting these selected cells. By building this model after the inputs and outputs are set, it will save the extracted model as an *.exp file.

FIG. 08 illustrates what happens when the *.exp file is opened in the ROV Evaluator 104. The ROV Evaluator can be used to open 105 existing *.exp files, save these files 106 after any changes have been made, evaluate or compute the model 107 or run Monte Carlo simulations thousands and millions of times 108 if required. All of the input assumptions and output forecasts are shown in the explorer section 109, and these inputs and outputs are shown in detail in its own panel, where the end-user can then make any changes to the inputs 110, click evaluate and obtain the output results 111.

FIG. 09 illustrates the input assumptions assuming a simulation is run. This screen is obtained by double clicking on any of the assumptions listed in the project explorer 109. The name of the variable 112 is shown to identify the specific input, as are its cell location in the original spreadsheet 113 and its initial value 114. If simulation is applied 115, then the end-user can choose the relevant probability distribution to apply to the input 116 and its corresponding parameters 117. For example, the triangular distribution requires minimum, most likely and maximum input parameters.

Figure 10:
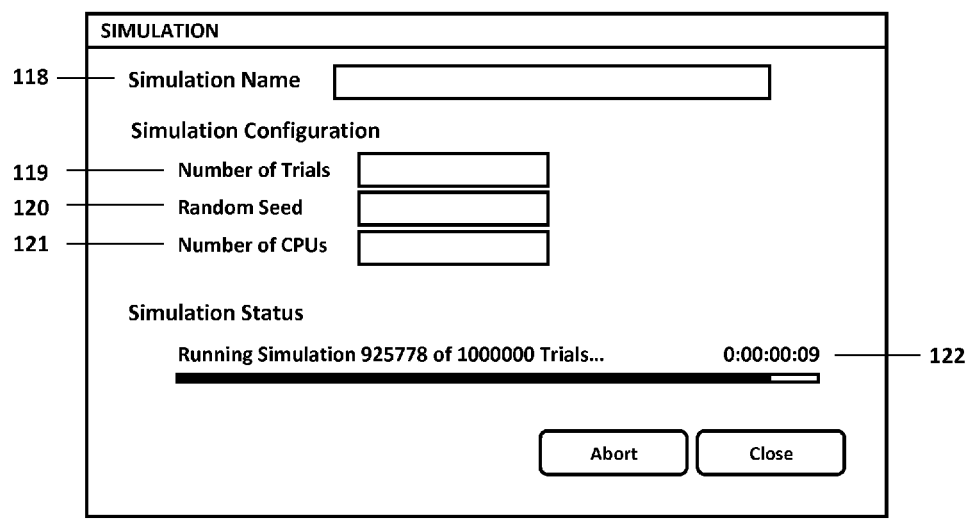
FIG. 10 illustrates the Monte Carlo simulation being run on the extracted file in the Extractor and Evaluator business process method.

FIG. 10 illustrates the simulation in progress. Multiple simulation profiles can be created in the same *.exp file by simply providing a unique name 118 to the simulation profile, and number of simulation trials 119 to run, where thousands and millions of trials can be run if required. The ROV Evaluator can also allow the end-user to input a random seed 120 value as a starting point for the random number generator. If a random seed is used, and assuming the same model with the same assumptions are applied, the result will always be identical. This seed number can be entered manually or a random seed is generated by clicking on the star icon beside the random seed number input. The end-user can also decide how many central processing units (CPU) to use 121 in running the simulation. This ROV Evaluator does distributive processing to distribute the workload to different computer cores such that the analysis can be run even faster. If an incorrect number of CPUs is entered, the software will revert back to 1 as the default. The simulation progress is then tracked 122 if the simulation is run (in this example, we show that a million simulation trials is run in several seconds).

Figure 11:
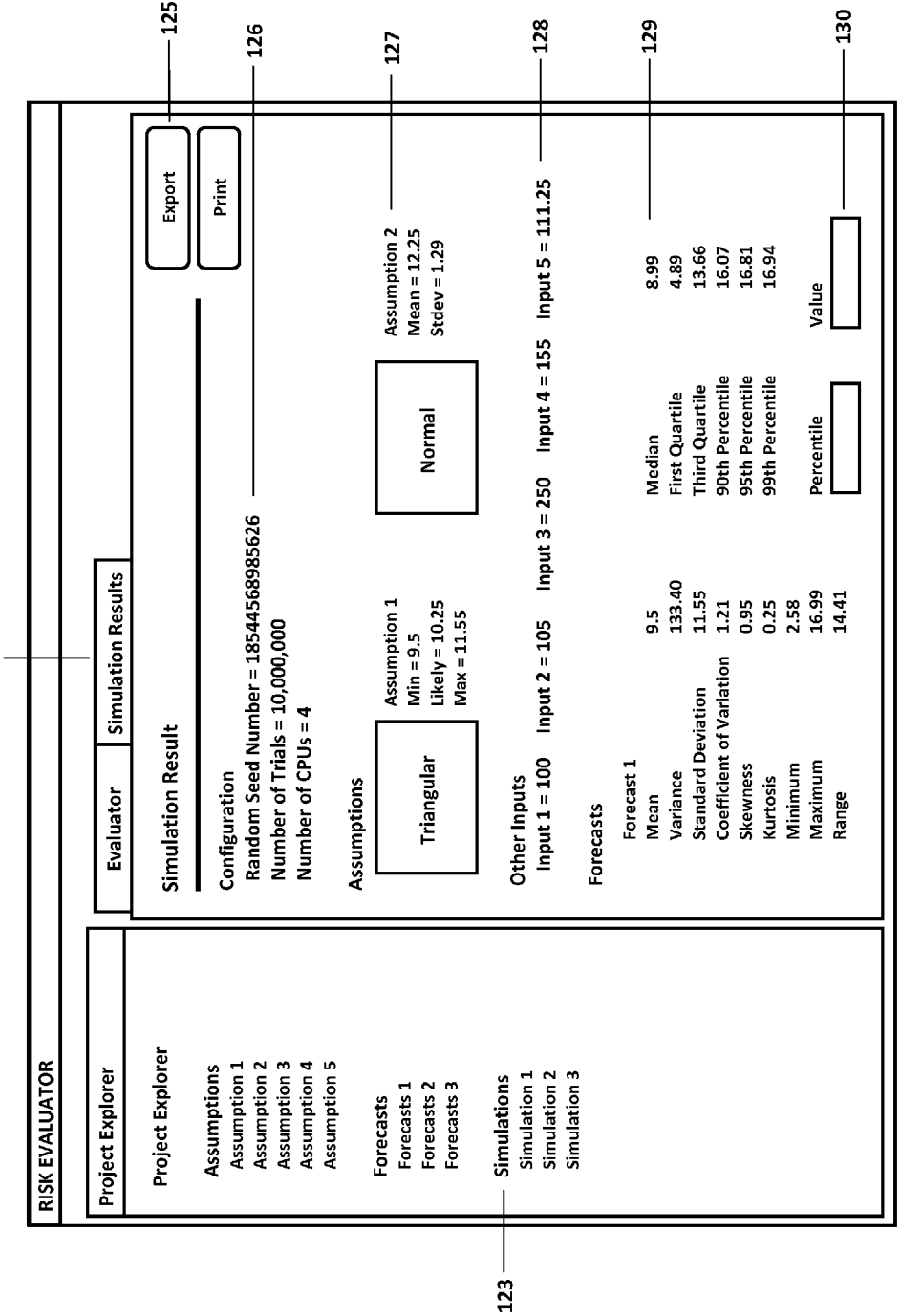
FIG. 11 illustrates the final results from a simulation run of the Evaluator.

FIG. 11 illustrates the results of the simulation 123. The simulation run 124 results can be exported to an XML data file format or printed if required 125 and the details of the simulation analysis is shown, including the configuration 126 of the simulation (number of trials, number of CPUs, exact seed number), as are the distributional input assumptions 127 and the single point inputs 128. The results of the simulation run is shown as a set of statistics 129 of the results (e.g., mean, variance, standard deviation, and so forth) and a tool to compute the value given some percentile or the percentile given some value 130. For example, the end-user can determine what the worst case scenario 5% of the time is, or what the probability that the result will be below $2.9 million is, and so forth.

Mathematical Probability Distributions

This section demonstrates the mathematical models and computations used in creating the Monte Carlo simulations. In order to get started with simulation, one first needs to understand the concept of probability distributions. To begin to understand probability, consider this example: You want to look at the distribution of nonexempt wages within one department of a large company. First, you gather raw data—in this case, the wages of each nonexempt employee in the department. Second, you organize the data into a meaningful format and plot the data as a frequency distribution on a chart. To create a frequency distribution, you divide the wages into group intervals and list these intervals on the chart's horizontal axis. Then you list the number or frequency of employees in each interval on the chart's vertical axis. Now you can easily see the distribution of nonexempt wages within the department. You can chart this data as a probability distribution. A probability distribution shows the number of employees in each interval as a fraction of the total number of employees. To create a probability distribution, you divide the number of employees in each interval by the total number of employees and list the results on the chart's vertical axis.

Probability distributions are either discrete or continuous. Discrete probability distributions describe distinct values, usually integers, with no intermediate values and are shown as a series of vertical bars. A discrete distribution, for example, might describe the number of heads in four flips of a coin as 0, 1, 2, 3, or 4. Continuous probability distributions are actually mathematical abstractions because they assume the existence of every possible intermediate value between two numbers; that is, a continuous distribution assumes there is an infinite number of values between any two points in the distribution. However, in many situations, you can effectively use a continuous distribution to approximate a discrete distribution even though the continuous model does not necessarily describe the situation exactly.

Probability Density Functions, Cumulative Distribution Functions, and Probability Mass Functions In mathematics and Monte Carlo simulation, a probability density function (PDF) represents a continuous probability distribution in terms of integrals. If a probability distribution has a density of $f(x)$, then intuitively the infinitesimal interval of [x, x+dx] has a probability of $f(x) dx$. The PDF therefore can be seen as a smoothed version of a probability histogram; that is, by providing an empirically large sample of a continuous random variable repeatedly, the histogram using very narrow ranges will resemble the random variable's PDF. The probability of the interval between [a, b] is given by $$\int_a^b f(x) dx,$$

which means that the total integral of the function $f$ must be 1.0. It is a common mistake to think of $f(a)$ as the probability of a. This is incorrect. In fact, $f(a)$ can sometimes be larger than 1—consider a uniform distribution between 0.0 and 0.5. The random variable x within this distribution will have $f(x)$ greater than 1. The probability in reality is the function $f(x)dx$ discussed previously, where dx is an infinitesimal amount.

The cumulative distribution function (CDF) is denoted as $F(x)=P(X \leq x)$ indicating the probability of X taking on a less than or equal value to x. Every CDF is monotonically increasing, is continuous from the right, and at the limits, have the following properties:

$$\lim_{x \to +\infty} F(x) = 0 \text{ and } \lim_{x \to +\infty} F(x) = 1.$$

Further, the CDF is related to the PDF by $$F(b) - F(a) = P(a \leq X \leq b) = \int_a^b f(x) dx,$$

where the PDF function $f$ is the derivative of the CDF function F.

In probability theory, a probability mass function or PMF gives the probability that a discrete random variable is exactly equal to some value. The PMF differs from the PDF in that the values of the latter, defined only for continuous random variables, are not probabilities; rather, its integral over a set of possible values of the random variable is a probability. A random variable is discrete if its probability distribution is discrete and can be characterized by a PMF. Therefore, X is a discrete random variable if $$\sum_u P(X = u) = 1$$

as u runs through all possible values of the random variable X.

Following is a detailed listing of the different types of probability distributions that can be used in Monte Carlo simulation. This listing is included in the appendix for the reader's reference.

Bernoulli or Yes/No Distribution

The Bernoulli distribution is a discrete distribution with two outcomes (e.g., head or tails, success or failure, 0 or 1). The Bernoulli distribution is the binomial distribution with one trial and can be used to simulate Yes/No or Success/Failure conditions. This distribution is the fundamental building block of other more complex distributions. For instance:

Binomial distribution: Bernoulli distribution with higher number of n total trials and computes the probability of x successes within this total number of trials.

Geometric distribution: Bernoulli distribution with higher number of trials and computes the number of failures required before the first success occurs.

Negative binomial distribution: Bernoulli distribution with higher number of trials and computes the number of failures before the xth success occurs.

The mathematical constructs for the Bernoulli distribution are as follows:

$$P(x) = \begin{cases} 1-p & \text{for } x=0 \\ p & \text{for } x=1 \end{cases}$$

or $$P(x) = p^x(1-p)^{1-x}$$

$$\text{mean} = p$$

$$\text{standard deviation} = \sqrt{p(1-p)}$$

$$\text{skewness} = \frac{1-2p}{\sqrt{p(1-p)}}$$

$$\text{excess kurtosis} = \frac{6p^2 - 6p + 1}{p(1-p)}$$

The probability of success (p) is the only distributional parameter. Also, it is important to note that there is only one trial in the Bernoulli distribution, and the resulting simulated value is either 0 or 1. The input requirements are such that Probability of Success >0 and <1 (that is, $0.0001 \le p \le 0.9999$).

Binomial Distribution

The binomial distribution describes the number of times a particular event occurs in a fixed number of trials, such as the number of heads in 10 flips of a coin or the number of defective items out of 50 items chosen.

The three conditions underlying the binomial distribution are:

For each trial, only two outcomes are possible that are mutually exclusive.

The trials are independent—what happens in the first trial does not affect the next trial.

The probability of an event occurring remains the same from trial to trial.

The mathematical constructs for the binomial distribution are as follows:

$$P(x) = \frac{n!}{x!(n-x)!} p^x (1-p)^{(n-x)}$$

for $n > 0$; $x = 0, 1, 2, \ldots n$; and $0 < p < 1$ $$\text{mean} = np$$

$$\text{standard deviation} = \sqrt{np(1-p)}$$

$$\text{skewness} = \frac{1-2p}{\sqrt{np(1-p)}}$$

$$\text{excess kurtosis} = \frac{6p^2 - 6p + 1}{np(1-p)}$$

The probability of success (p) and the integer number of total trials (n) are the distributional parameters. The number of successful trials is denoted x. It is important to note that probability of success (p) of 0 or 1 are trivial conditions and do not require any simulations, and hence, are not allowed in the software. The input requirements are such that Probability of Success >0 and <1 (that is, $0.0001 \le p \le 0.9999$), the Number of Trials $\ge 1$ or positive integers and $\le 1000$ (for larger trials, use the normal distribution with the relevant computed binomial mean and standard deviation as the normal distribution's parameters).

Discrete Uniform

The discrete uniform distribution is also known as the equally likely outcomes distribution, where the distribution has a set of N elements, and each element has the same probability. This distribution is related to the uniform distribution but its elements are discrete and not continuous.

The mathematical constructs for the discrete uniform distribution are as follows:

$$P(x) = \frac{1}{N}$$

$$\text{mean} = \frac{N+1}{2} \text{ ranked value}$$

$$\text{standard deviation} = \sqrt{\frac{(N-1)(N+1)}{12}} \text{ ranked value}$$

skewness = 0 (that is, the distribution is perfectly symmetrical)

$$\text{excess kurtosis} = \frac{-6(N^2+1)}{5(N-1)(N+1)} \text{ ranked value}$$

The input requirements are such that Minimum <Maximum and both must be integers (negative integers and zero are allowed).

Geometric Distribution

The geometric distribution describes the number of trials until the first successful occurrence, such as the number of times you need to spin a roulette wheel before you win.

The three conditions underlying the geometric distribution are:

The number of trials is not fixed.

The trials continue until the first success.

The probability of success is the same from trial to trial.

The mathematical constructs for the geometric distribution are as follows:

$$P(x) = p(1-p)^{x-1}$$

for $0 < p < 1$ and $x = 1, 2, \ldots, n$ $$\text{mean} = \frac{1}{p} - 1$$

$$\text{standard deviation} = \sqrt{\frac{1-p}{p^2}}$$

$$\text{skewness} = \frac{2-p}{\sqrt{1-p}}$$

$$\text{excess kurtosis} = \frac{p^2 - 6p + 6}{1-p}$$

The probability of success (p) is the only distributional parameter. The number of successful trials simulated is denoted x, which can only take on positive integers. The input requirements are such that Probability of success >0 and <1 (that is, $0.0001 \le p \le 0.9999$). It is important to note that probability of success (p) of 0 or 1 are trivial conditions and do not require any simulations, and hence, are not allowed in the software.

Hypergeometric Distribution

The hypergeometric distribution is similar to the binomial distribution in that both describe the number of times a particular event occurs in a fixed number of trials. The difference is that binomial distribution trials are independent, whereas hypergeometric distribution trials change the probability for each subsequent trial and are called trials without replacement. For example, suppose a box of manufactured parts is known to contain some defective parts. You choose a part from the box, find it is defective, and remove the part from the box. If you choose another part from the box, the probability that it is defective is somewhat lower than for the first part because you have removed a defective part. If you had replaced the defective part, the probabilities would have remained the same, and the process would have satisfied the conditions for a binomial distribution.

The three conditions underlying the hypergeometric distribution are:

The total number of items or elements (the population size) is a fixed number, a finite population. The population size must be less than or equal to 1,750.

The sample size (the number of trials) represents a portion of the population.

The known initial probability of success in the population changes after each trial.

The mathematical constructs for the hypergeometric distribution are as follows:

$$P(x) = \frac{\frac{(N_x)!}{x!(N_x-x)!} \frac{(N-N_x)!}{(n-x)!(N-N_x-n+x)!}}{\frac{N!}{n!(N-n)!}}$$

for $x = \text{Max}(n-(N-N_x), 0), \ldots, \text{Min}(n, N_x)$ $$\text{mean} = \frac{N_x n}{N}$$

$$\text{standard deviation} = \sqrt{\frac{(N-N_x)N_x n(N-n)}{N^2(N-1)}}$$

$$\text{skewness} = \frac{(N-2N_x)(N-2n)}{N-2} \sqrt{\frac{N-1}{(N-N_x)N_x n(N-n)}}$$

$$\text{excess kurtosis} = \frac{V(N, N_x, n)}{(N-N_x)N_x n(-3+N)(-2+N)(-N+n)} \text{ where}$$

$V(N, N_x, n) = (N-N_x)^3 - (N-N_x)^5 + 3(N-N_x)^2 N_x - 6(N-N_x)^3 N_x +$
$(N-N_x)^4 N_x + 3(N-N_x)N_x^2 - 12(N-N_x)^2 N_x^2 + 8(N-N_x)^3 N_x^2 +$
$N_x^3 - 6(N-N_x)N_x^3 + 8(N-N_x)^2 N_x^3(N-N_x)N_x^4 - N_x^5 -$
$6(N-N_x)^3 N_x + 6(N-N_x)^4 N_x + 18(N-N_x)^2 N_x n - 6(N-N_x)^3 N_x n +$
$18(N-N_x)N_x^2 n - 24(N-N_x)^2 N_x^2 n - 6(N-N_x)^3 n - 6(N-N_x)N_x^3 n +$
$6N_x^4 n + 6(N-N_x)n^2 - 6(N-N_x)^3 n^2 - 24(N-N_x)N_x n^2 +$
$12(N-N_x)^2 N_x n^2 + 6N_x^2 n^2 + 12(N-N_x)N_x^2 n^2 - 6N_x^3 n^2$

The number of items in the population (N), trials sampled (n), and number of items in the population that have the successful trait ($N_x$) are the distributional parameters. The number of successful trials is denoted x. The input requirements are such that Population ≥2 and integer, Trials >0 and integer Successes >0 and integer, Population >Successes Trials <Population and Population <1750.

Negative Binomial Distribution

The negative binomial distribution is useful for modeling the distribution of the number of trials until the rth successful occurrence, such as the number of sales calls you need to make to close a total of 10 orders. It is essentially a superdistribution of the geometric distribution. This distribution shows the probabilities of each number of trials in excess of r to produce the required success r.

Conditions

The three conditions underlying the negative binomial distribution are:

The number of trials is not fixed.

The trials continue until the rth success.

The probability of success is the same from trial to trial.

The mathematical constructs for the negative binomial distribution are as follows:

$$P(x) = \frac{(x=r-1)!}{(r-1)!x!} p^r (1-p)^x$$

for $x = r, r+1, \ldots$; and $0 < p < 1$ $$\text{mean} = \frac{r(1-p)}{p}$$

$$\text{standard deviation} = \sqrt{\frac{r(1-p)}{p^2}}$$

$$\text{skewness} = \frac{2-p}{\sqrt{r(1-p)}}$$

$$\text{excess kurtosis} = \frac{p^2 - 6p + 6}{r(1-p)}$$

Probability of success (p) and required successes (r) are the distributional parameters. Where the input requirements are such that Successes required must be positive integers >0 and <8000, Probability of success >0 and <1 (that is, 0.0001≤p≤0.9999). It is important to note that probability of success (p) of 0 or 1 are trivial conditions and do not require any simulations, and hence, are not allowed in the software.

Poisson Distribution

The Poisson distribution describes the number of times an event occurs in a given interval, such as the number of telephone calls per minute or the number of errors per page in a document.

Conditions

The three conditions underlying the Poisson distribution are:

The number of possible occurrences in any interval is unlimited.

The occurrences are independent. The number of occurrences in one interval does not affect the number of occurrences in other intervals.

The average number of occurrences must remain the same from interval to interval.

The mathematical constructs for the Poisson are as follows:

$$P(x) = \frac{e^{-\lambda}\lambda^x}{x!} \text{ for } x \text{ and } \lambda > 0$$

$$\text{mean} = \lambda$$

$$\text{standard deviation} = \sqrt{\lambda}$$

$$\text{skewness} = \frac{1}{\sqrt{\lambda}}$$

$$\text{excess kurtosis} = \frac{1}{\lambda}$$

Rate ($\lambda$) is the only distributional parameter and the input requirements are such that Rate >0 and ≤1000 (that is, 0.0001≤rate ≤1000).

Continuous Distributions

Beta Distribution

The beta distribution is very flexible and is commonly used to represent variability over a fixed range. One of the more important applications of the beta distribution is its use as a conjugate distribution for the parameter of a Bernoulli distribution. In this application, the beta distribution is used to represent the uncertainty in the probability of occurrence of an event. It is also used to describe empirical data and predict the random behavior of percentages and fractions, as the range of outcomes is typically between 0 and 1. The value of the beta distribution lies in the wide variety of shapes it can assume when you vary the two parameters, alpha and beta. If the parameters are equal, the distribution is symmetrical. If either parameter is 1 and the other parameter is greater than 1, the distribution is J-shaped. If alpha is less than beta, the distribution is said to be positively skewed (most of the values are near the minimum value). If alpha is greater than beta, the distribution is negatively skewed (most of the values are near the maximum value). The mathematical constructs for the beta distribution are as follows:

$$f(x) = \frac{(x)^{(\alpha-1)}(1-x)^{(\beta-1)}}{\left[\frac{\Gamma(\alpha)\Gamma(\beta)}{\Gamma(\alpha+\beta)}\right]} \text{ for } \alpha > 0; \beta > 0; x > 0$$

$$\text{mean} = \frac{\alpha}{\alpha+\beta}$$

$$\text{standard deviation} = \sqrt{\frac{\alpha\beta}{(\alpha+\beta)^2(1+\alpha+\beta)}}$$

$$\text{skewness} = \frac{2(\beta-\alpha)\sqrt{1+\alpha+\beta}}{(2+\alpha+\beta)\sqrt{\alpha\beta}}$$

$$\text{excess kurtosis} = \frac{3(\alpha+\beta+1)[\alpha\beta(\alpha+\beta-6)+2(\alpha+\beta)^2]}{\alpha\beta(\alpha+\beta+2)(\alpha+\beta+3)} - 3$$

Alpha ($\alpha$) and beta ($\beta$) are the two distributional shape parameters, and $\Gamma$ is the gamma function. The two conditions underlying the beta distribution are:
  The uncertain variable is a random value between 0 and a positive value.
  The shape of the distribution can be specified using two positive values.
Input Requirements:
  Alpha and beta >0 and can be any positive value
Cauchy Distribution or Lorentzian Distribution or Breit-Wigner Distribution
  The Cauchy distribution, also called the Lorentzian distribution or Breit-Wigner distribution, is a continuous distribution describing resonance behavior. It also describes the distribution of horizontal distances at which a line segment tilted at a random angle cuts the x-axis.
  The mathematical constructs for the cauchy or Lorentzian distribution are as follows:

$$f(x) = \frac{1}{\pi} \frac{\gamma/2}{(x-m)^2 + \gamma^2/4}$$

The cauchy distribution is a special case where it does not have any theoretical moments (mean, standard deviation, skewness, and kurtosis) as they are all undefined. Mode location (m) and scale ($\gamma$) are the only two parameters in this distribution. The location parameter specifies the peak or mode of the distribution while the scale parameter specifies the half-width at half-maximum of the distribution. In addition, the mean and variance of a cauchy or Lorentzian distribution are undefined. In addition, the cauchy distribution is the Student's t distribution with only 1 degree of freedom. This distribution is also constructed by taking the ratio of two standard normal distributions (normal distributions with a mean of zero and a variance of one) that are independent of one another. The input requirements are such that Location can be any value whereas Scale >0 and can be any positive value.

Chi-Square Distribution

The chi-square distribution is a probability distribution used predominatly in hypothesis testing, and is related to the gamma distribution and the standard normal distribution. For instance, the sums of independent normal distributions are distributed as a chi-square ($\chi^2$) with k degrees of freedom:

$$Z_1^2 + Z_2^2 + \ldots + Z_k^{2d} \sim \chi_k^2$$

The mathematical constructs for the chi-square distribution are as follows:

$$f(x) = \frac{2^{-k/2}}{\Gamma(k/2)} x^{k/2-1} e^{-x/2} \text{ for all } x > 0$$

$$\text{mean} = k$$

$$\text{standard deviation} = \sqrt{2k}$$

$$\text{skewness} = 2\sqrt{\frac{2}{k}}$$

$$\text{excess kurtosis} = \frac{12}{k}$$

$\Gamma$ is the gamma function. Degrees of freedom k is the only distributional parameter.

The chi-square distribution can also be modeled using a gamma distribution by setting the shape $$\text{parameter} = \frac{k}{2}$$

and scale=$2S^2$ where S is the scale. The input requirements are such that Degrees of freedom >1 and must be an integer <1000.

Exponential Distribution

The exponential distribution is widely used to describe events recurring at random points in time, such as the time between failures of electronic equipment or the time between arrivals at a service booth. It is related to the Poisson distribution, which describes the number of occurrences of an event in a given interval of time. An important characteristic of the exponential distribution is the "memoryless" property, which means that the future lifetime of a given object has the same distribution, regardless of the time it existed. In other words, time has no effect on future outcomes. The mathematical constructs for the exponential distribution are as follows:

$$f(x) = \lambda e^{-\lambda x} \text{ for } x \geq 0; \lambda > 0$$

$$\text{mean} = \frac{1}{\lambda}$$

$$\text{standard deviation} = \frac{1}{\lambda}$$

skewness=2 (this value applies to all success rate $\lambda$ inputs)
excess kurtosis=6 (this value applies to all success rate $\lambda$ inputs)

Success rate (λ) is the only distributional parameter. The number of successful trials is denoted x.

The condition underlying the exponential distribution is:

The exponential distribution describes the amount of time between occurrences.

Input requirements: Rate >0 and ≤300

Extreme Value Distribution or Gumbel Distribution

The extreme value distribution (Type 1) is commonly used to describe the largest value of a response over a period of time, for example, in flood flows, rainfall, and earthquakes. Other applications include the breaking strengths of materials, construction design, and aircraft loads and tolerances. The extreme value distribution is also known as the Gumbel distribution.

The mathematical constructs for the extreme value distribution are as follows:

$$f(x) = \frac{1}{\beta} z e^{-Z} \text{ where } z = e^{\frac{x-m}{\beta}} \text{ and } m$$

for $\beta > 0$; and any value of $x$ $$\text{mean} = m + 0.577215\beta$$

$$\text{standard deviation} = \sqrt{\frac{1}{6}\pi^2 \beta^2}$$

$$\text{skewness} = \frac{12\sqrt{6}\,(1.2020569)}{\pi^3} = 1.13955$$

(this applies for all values of mode and scale)

excess kurtosis=5.4 (this applies for all values of mode and scale)

Mode (m) and scale (β) are the distributional parameters. There are two standard parameters for the extreme value distribution: mode and scale. The mode parameter is the most likely value for the variable (the highest point on the probability distribution). The scale parameter is a number greater than 0. The larger the scale parameter, the greater the variance. The input requirements are such that Mode can be any value and Scale >0.

F Distribution or Fisher-Snedecor Distribution

The F distribution, also known as the Fisher-Snedecor distribution, is another continuous distribution used most frequently for hypothesis testing. Specifically, it is used to test the statistical difference between two variances in analysis of variance tests and likelihood ratio tests. The F distribution with the numerator degree of freedom n and denominator degree of freedom m is related to the chi-square distribution in that:

$$\frac{\chi_n^2/n^d}{\chi_m^2/m} \sim F_{n,m}$$

$$\text{or } f(x) = \frac{\Gamma\left(\frac{n+m}{2}\right)\left(\frac{n}{m}\right)^{n/2} x^{n/2-1}}{\Gamma\left(\frac{n}{2}\right)\Gamma\left(\frac{m}{2}\right)\left[x\left(\frac{n}{m}\right)+1\right]^{(n+m)/2}}$$

$$\text{mean} = \frac{m}{m-2}$$

$$\text{standard deviation} = \frac{2m^2(m+n-2)}{n(m-2)^2(m-4)} \text{ for all } m > 4$$

$$\text{skewness} = \frac{2(m+2n-2)}{m-6}\sqrt{\frac{2(m-4)}{n(m+n-2)}}$$

excess kurtosis =

$$\frac{12(-16+20m-8m^2+m^3+44n-32mn+5m^2n-22n^2+5mn^2}{n(m-6)(m-8)(n+m-2)}$$

The numerator degree of freedom n and denominator degree of freedom m are the only distributional parameters. The input requirements are such that Degrees of freedom numerator and degrees of freedom denominator both >0 integers.

Gamma Distribution (Erlang Distribution)

The gamma distribution applies to a wide range of physical quantities and is related to other distributions: lognormal, exponential, Pascal, Erlang, Poisson, and Chi-Square. It is used in meteorological processes to represent pollutant concentrations and precipitation quantities. The gamma distribution is also used to measure the time between the occurrence of events when the event process is not completely random. Other applications of the gamma distribution include inventory control, economic theory, and insurance risk theory. The gamma distribution is most often used as the distribution of the amount of time until the rth occurrence of an event in a Poisson process. When used in this fashion, the three conditions underlying the gamma distribution are:

The number of possible occurrences in any unit of measurement is not limited to a fixed number.

The occurrences are independent. The number of occurrences in one unit of measurement does not affect the number of occurrences in other units.

The average number of occurrences must remain the same from unit to unit.

The mathematical constructs for the gamma distribution are as follows:

$$f(x) = \frac{\left(\frac{x}{\beta}\right)^{\alpha-1} e^{-\frac{x}{\beta}}}{\Gamma(\alpha)\beta} \text{ with any value of } \alpha > 0 \text{ and } \beta > 0$$

$$\text{mean} = \alpha\beta$$

$$\text{standard deviation} = \sqrt{\alpha\beta^2}$$

$$\text{skewness} = \frac{2}{\sqrt{\alpha}}$$

$$\text{excess kurtosis} = \frac{6}{\alpha}$$

Shape parameter alpha (α) and scale parameter beta (β) are the distributional parameters, and Γ is the gamma function. When the alpha parameter is a positive integer, the gamma distribution is called the Erlang distribution, used to predict waiting times in queuing systems, where the Erlang distribution is the sum of independent and identically distributed random variables each having a memoryless exponential distribution. Setting n as the number of these random variables, the mathematical construct of the Erlang distribution is:

$$f(x) = \frac{x^{n-1}e^{-x}}{(n-1)!}$$

for all x>0 and all positive integers of n, where the input requirements are such that Scale Beta >0 and can be any positive value, Shape Alpha ≥0.05 and any positive value, and Location can be any value.

Logistic Distribution

The logistic distribution is commonly used to describe growth, that is, the size of a population expressed as a function of a time variable. It also can be used to describe chemical reactions and the course of growth for a population or individual.

The mathematical constructs for the logistic distribution are as follows:

$$f(x) = \frac{e^{\frac{\mu-x}{\alpha}}}{\alpha\left[1 + e^{\frac{\mu-x}{\alpha}}\right]^2}$$

for any value of $\alpha$ and $\mu$ $$\text{mean} = \mu$$

$$\text{standard deviation} = \sqrt{\frac{1}{3}\pi^2 \alpha^2}$$

skewness=0 (this applies to all mean and scale inputs)
excess kurtosis=1.2 (this applies to all mean and scale inputs)

Mean ($\mu$) and scale ($\alpha$) are the distributional parameters. There are two standard parameters for the logistic distribution: mean and scale. The mean parameter is the average value, which for this distribution is the same as the mode, because this distribution is symmetrical. The scale parameter is a number greater than 0. The larger the scale parameter, the greater the variance.

Input Requirements:
Scale >0 and can be any positive value
Mean can be any value

Lognormal Distribution

The lognormal distribution is widely used in situations where values are positively skewed, for example, in financial analysis for security valuation or in real estate for property valuation, and where values cannot fall below zero. Stock prices are usually positively skewed rather than normally (symmetrically) distributed. Stock prices exhibit this trend because they cannot fall below the lower limit of zero but might increase to any price without limit. Similarly, real estate prices illustrate positive skewness and are lognormally distributed as property values cannot become negative.

The three conditions underlying the lognormal distribution are:
The uncertain variable can increase without limits but cannot fall below zero.
The uncertain variable is positively skewed, with most of the values near the lower limit.
The natural logarithm of the uncertain variable yields a normal distribution.

Generally, if the coefficient of variability is greater than 30 percent, use a lognormal distribution. Otherwise, use the normal distribution.

The mathematical constructs for the lognormal distribution are as follows:

$$f(x) = \frac{1}{x\sqrt{2\pi}\ln(\sigma)} e^{-\frac{[\ln(x)-\ln(\mu)]^2}{2[\ln(\sigma)]^2}}$$

for $x > 0$; $\mu > 0$ and $\sigma > 0$ $$\text{mean} = \exp\left\{\mu + \frac{\sigma^2}{2}\right\}$$

$$\text{standard deviation} = \sqrt{\exp(\sigma^2 + 2\mu)[\exp(\sigma^2) - 1]}$$

$$\text{skewness} = \left\lfloor\sqrt{\exp(\sigma^2) - 1}\right\rfloor(2 + \exp(\sigma^2))$$

$$\text{excess kurtosis} = \exp(4\sigma^2) + 2\exp(3\sigma^2) + 3\exp(2\sigma^2) - 6$$

Mean ($\mu$) and standard deviation ($\sigma$) are the distributional parameters. The input requirements are such that Mean and Standard deviation are both >0 and can be any positive value. By default, the lognormal distribution uses the arithmetic mean and standard deviation. For applications for which historical data are available, it is more appropriate to use either the logarithmic mean and standard deviation, or the geometric mean and standard deviation.

Normal Distribution

The normal distribution is the most important distribution in probability theory because it describes many natural phenomena, such as people's IQs or heights. Decision makers can use the normal distribution to describe uncertain variables such as the inflation rate or the future price of gasoline.

Conditions

The three conditions underlying the normal distribution are:
Some value of the uncertain variable is the most likely (the mean of the distribution).
The uncertain variable could as likely be above the mean as it could be below the mean (symmetrical about the mean).
The uncertain variable is more likely to be in the vicinity of the mean than further away.

The mathematical constructs for the normal distribution are as follows:

$$f(x) = \frac{1}{\sqrt{2\pi}\,\sigma} e^{-\frac{(x-\mu)^2}{2\sigma^2}}$$

for all values of x and $\mu$; while $\sigma>0$
mean=$\mu$
standard deviation=$\sigma$
skewness=0 (this applies to all inputs of mean and standard deviation)
excess kurtosis=0 (this applies to all inputs of mean and standard deviation)

Mean ($\mu$) and standard deviation ($\sigma$) are the distributional parameters. The input requirements are such that Standard deviation >0 and can be any positive value and Mean can be any value.

Pareto Distribution

The Pareto distribution is widely used for the investigation of distributions associated with such empirical phenomena as city population sizes, the occurrence of natural resources, the size of companies, personal incomes, stock price fluctuations, and error clustering in communication circuits.

The mathematical constructs for the pareto are as follows:

$$f(x) = \frac{\beta L^\beta}{x^{(1+\beta)}} \text{ for } x > L$$

$$\text{mean} = \frac{\beta L}{\beta - 1}$$

$$\text{standard deviation} = \sqrt{\frac{\beta L^2}{(\beta-1)^2(\beta-2)}}$$

$$\text{skewness} = \sqrt{\frac{\beta-2}{\beta}} \left[\frac{2(\beta+1)}{(\beta-3)}\right]$$

$$\text{excess kurtosis} = \frac{6(\beta^3 + \beta^2 - 6\beta - 2)}{\beta(\beta-3)(\beta-4)}$$

Location (L) and shape (β) are the distributional parameters.

There are two standard parameters for the Pareto distribution: location and shape. The location parameter is the lower bound for the variable. After you select the location parameter, you can estimate the shape parameter. The shape parameter is a number greater than 0, usually greater than 1. The larger the shape parameter, the smaller the variance and the thicker the right tail of the distribution. The input requirements are such that Location >0 and can be any positive value while Shape ≥0.05.

Student's t Distribution

The Student's t distribution is the most widely used distribution in hypothesis test. This distribution is used to estimate the mean of a normally distributed population when the sample size is small, and is used to test the statistical significance of the difference between two sample means or confidence intervals for small sample sizes.

The mathematical constructs for the t-distribution are as follows:

$$f(t) = \frac{\Gamma[(r+1)/2]}{\sqrt{r\pi}\,\Gamma[r/2]}(1 + t^2/r)^{-(r+1)/2}$$

mean=0 (this applies to all degrees of freedom r except if the distribution is shifted to another nonzero central location)

$$\text{standard deviation} = \sqrt{\frac{r}{r-2}}$$

$$\text{skewness} = 0$$

$$\text{excess kurtosis} = \frac{6}{r-4} \text{ for all } r > 4$$

where $$t = \frac{x - \bar{x}}{s}$$

and Γ is the gamma function.

Degree of freedom r is the only distributional parameter. The t-distribution is related to the F-distribution as follows: the square of a value of t with r degrees of freedom is distributed as F with 1 and r degrees of freedom. The overall shape of the probability density function of the t-distribution also resembles the bell shape of a normally distributed variable with mean 0 and variance 1, except that it is a bit lower and wider or is leptokurtic (fat tails at the ends and peaked center). As the number of degrees of freedom grows (say, above 30), the t-distribution approaches the normal distribution with mean 0 and variance 1. The input requirements are such that Degrees of freedom ≥1 and must be an integer.

Triangular Distribution

The triangular distribution describes a situation where you know the minimum, maximum, and most likely values to occur. For example, you could describe the number of cars sold per week when past sales show the minimum, maximum, and usual number of cars sold.

Conditions

The three conditions underlying the triangular distribution are:

The minimum number of items is fixed.

The maximum number of items is fixed.

The most likely number of items falls between the minimum and maximum values, forming a triangular-shaped distribution, which shows that values near the minimum and maximum are less likely to occur than those near the most-likely value.

The mathematical constructs for the triangular distribution are as follows:

$$f(x) = \begin{cases} \dfrac{2(x - \text{Min})}{(\text{Max} - \text{Min})(\text{Likely} - \text{min})} & \text{for } \text{Min} < x < \text{Likely} \\[6pt] \dfrac{2(\text{Max} - x)}{(\text{Max} - \text{Min})(\text{Max} - \text{Likely})} & \text{for } \text{Likely} < x < \text{Max} \end{cases}$$

$$\text{mean} = \frac{1}{3}(\text{Min} + \text{Likely} + \text{Max})$$

standard deviation =

$$\sqrt{\frac{1}{18}\left(\frac{\text{Min}^2 + \text{Likely}^2 + \text{Max}^2 -}{\text{Min Max} - \text{Min Likely} - \text{Max Likely}}\right)}$$

$$\text{skewness} = \frac{\sqrt{2}\,(\text{Min} + \text{Max} - 2\,\text{Likely})(2\,\text{Min} - \text{Max} - \text{Likely})(\text{Min} - 2\,\text{Max} + \text{Likely})}{5\left(\dfrac{\text{Min}^2 + \text{Max}^2 + \text{Likely}^2 -}{\text{Min Max} - \text{Min Likely} - \text{Max Likely}}\right)^{3/2}}$$

$$\text{excess kurtosis} = -0.6$$

Minimum (Min), most likely (Likely) and maximum (Max) are the distributional parameters and the input requirements are such that Min ≤Most Likely ≤Max and can take any value, Min <Max and can take any value.

Uniform Distribution

With the uniform distribution, all values fall between the minimum and maximum and occur with equal likelihood.

The three conditions underlying the uniform distribution are:

The minimum value is fixed.

The maximum value is fixed.

All values between the minimum and maximum occur with equal likelihood.

The mathematical constructs for the uniform distribution are as follows:

$$f(x) = \frac{1}{\text{Max} - \text{Min}}$$

for all values such that Min < Max $$\text{mean} = \frac{\text{Min} + \text{Max}}{2}$$

$$\text{standard deviation} = \sqrt{\frac{(\text{Max} - \text{Min})^2}{12}}$$

skewness=0
excess kurtosis=−1.2 (this applies to all inputs of Min and Max)

Maximum value (Max) and minimum value (Min) are the distributional parameters. The input requirements are such that Min <Max and can take any value.

Weibull Distribution (Rayleigh Distribution)

The Weibull distribution describes data resulting from life and fatigue tests. It is commonly used to describe failure time in reliability studies as well as the breaking strengths of materials in reliability and quality control tests. Weibull distributions are also used to represent various physical quantities, such as wind speed. The Weibull distribution is a family of distributions that can assume the properties of several other distributions. For example, depending on the shape parameter you define, the Weibull distribution can be used to model the exponential and Rayleigh distributions, among others. The Weibull distribution is very flexible. When the Weibull shape parameter is equal to 1.0, the Weibull distribution is identical to the exponential distribution. The Weibull location parameter lets you set up an exponential distribution to start at a location other than 0.0. When the shape parameter is less than 1.0, the Weibull distribution becomes a steeply declining curve. A manufacturer might find this effect useful in describing part failures during a burn-in period.

The mathematical constructs for the Weibull distribution are as follows:

$$f(x) = \frac{\alpha}{\beta}\left[\frac{x}{\beta}\right]^{\alpha-1} e^{-\left(\frac{x}{\beta}\right)^{\alpha}}$$

$$\text{mean} = \beta\Gamma(1 + \alpha^{-1})$$

$$\text{standard deviation} = \beta^2[\Gamma(1 + 2\alpha^{-1}) - \Gamma^2(1 + \alpha^{-1})]$$

$$\text{skewness} = \frac{2\Gamma^3(1 + \beta^{-1}) - 3\Gamma(1 + \beta^{-1})\Gamma(1 + 2\beta^{-1}) + \Gamma(1 + 3\beta^{-1})}{[\Gamma(1 + 2\beta^{-1}) - \Gamma^2(1 + \beta^{-1})]^{3/2}}$$

$$\text{excess kurtosis} = \frac{-6\Gamma^4(1 + \beta^{-1}) + 12\Gamma^2(1 + \beta^{-1})\Gamma(1 + 2\beta^{-1}) - 3\Gamma^2(1 + 2\beta^{-1}) - 4\Gamma(1 + \beta^{-1})\Gamma(1 + 3\beta^{-1}) + \Gamma(1 + 4\beta^{-1})}{[\Gamma(1 + 2\beta^{-1}) - \Gamma^2(1 + \beta^{-1})]^2}$$

Location (L), shape ($\alpha$) and scale ($\beta$) are the distributional parameters, and $\Gamma$ is the Gamma function. The input requirements are such that Scale >0 and can be any positive value, Shape ≥0.05 and Location can take on any value.

I claim:

1. A computer implemented method for converting spreadsheet models into mathematical code that is executable by a computer machine independent of the source application used to generate said models, said system comprising the steps of:
    installing a Real Option Valuation (ROV) compiler on said computer,
    said ROV compiler compiling a selected spreadsheet file generated in a source application, said spreadsheet file comprising at least one model, wherein said compiling is performed by extracting from the spreadsheet file: (1) all formulas, variables, and variable interrelationships of said at least one model, and (2) selected inputs and outputs for said model, into an export file (.exp file) using an ROV Extractor module, and generating an encrypted executable file (.exe file), such that said formulas are hidden from a user who executes said executable file;
    linking said executable file to any additional files, including said export file, used by said at least one model,
        wherein said executable file can be run in a different application from the source application or from a command line prompt in said computer,
        wherein said export file is configured by said ROV Extractor to be openable only by an ROV Evaluator module in accordance with an encryption template;
    sending the compiled executable file to the user for execution on their computer,
        wherein upon opening said executable file the at least one model is displayed along with the selected inputs and outputs;
    said ROV Extractor accepting different input values from said user and executing said formulas using said different input values; and
    said ROV Evaluator reporting the outputs of said execution to the user.

2. The method of claim 1, wherein a Monte Carlo simulation is applied to said at least one model.

3. The method of claim 1, wherein said model can be lifted from said source application and compiled into an optimized file, the file able to be linked with a second file, wherein said files can link with other files to form components of a much larger complex web of models, wherein outputs of one component file can become inputs of a second component file, and this linking of files can be continued without limit.

4. The method of claim 1, wherein a password is required to access and run said executable file.

5. The method of claim 1, wherein said spreadsheet file is converted into mathematical code that is protected by a license with a use restriction.

6. The method of claim 5, wherein said license utilizes hardware identification protection.

7. The method of claim 5, wherein said use restriction is a total number of uses.

8. The method of claim 5, wherein said use restriction is a number of days before the license expires.

9. The method of claim 5, wherein said use restriction is a specific license expiration date.

10. The method of claim 5, wherein said use restriction is a limited number of users.

11. The method of claim 5, wherein said use restriction limits use to a specific computer.

12. The method of claim 1, wherein multiple export files are linked together to create a more complex model.

13. The method of claim 1, further comprising the step of sending the export file to the user, wherein said export file is opened using said ROV evaluator tool.

14. The method of claim 13, wherein said ROV evaluator is configured to allow a user to change any of the input values for the formulas in said export file by manually overriding said values.

15. The method of claim 1, wherein said ROV evaluator is configured to provide user changeable settings for running a Monte Carlo simulation on said at least one model.

16. A system to convert spreadsheet models into mathematical code that is executable by a computer machine independent of the source application used to generate said models, said system comprising:
- a Real Options Valuation (ROV) extractor module stored in a memory and executing on said computer machine, configured to extract mathematical data from said spread sheet;
- an ROV compiler executing on said computing machine to convert at least one model in a spreadsheet file into mathematical code using said ROV extractor module to extract:
  (1) all formulas, variables, and variable interrelationships of said at least one model, and (2) selected inputs and outputs for said model, into an export file, and generating an encrypted executable file, such that said formulas are hidden from a user who executes said executable file,
  wherein said executable file is linked to any additional files, including said export file, used by said at least one model,
  wherein said executable file can be run in a different application from the source application or from a command line prompt in said computer machine,
  wherein said executable file is sent to the user for execution on their computer;
- an ROV Evaluator module executing on said computer machine, wherein said export file is configured to be openable only by said ROV Evaluator module in accordance with an encryption template;
  wherein upon opening said executable file the at least one model is displayed along with the selected inputs and outputs,
  wherein said ROV Extractor accepts different input values from said user and executes said formulas using said different input values,
  wherein said ROV Evaluator reports the outputs of said execution to the user.

17. The system of claim 16, wherein multiple export files are linked together to create a more complex model.

18. The system of claim 16, wherein said export file is sent to the user and said export file is opened using said ROV evaluator tool.

19. The system of claim 18, wherein said ROV evaluator is configured to allow a user to change any of the input values for the formulas in said export file by manually overriding said values.

20. The system of claim 16, wherein said ROV evaluator is configured to provide user changeable simulation settings for running a Monte Carlo simulation on said at least one model.

21. The system of claim 20, wherein a Monte Carlo simulation is applied to said at least one model.

* * * * *